Figure 6:
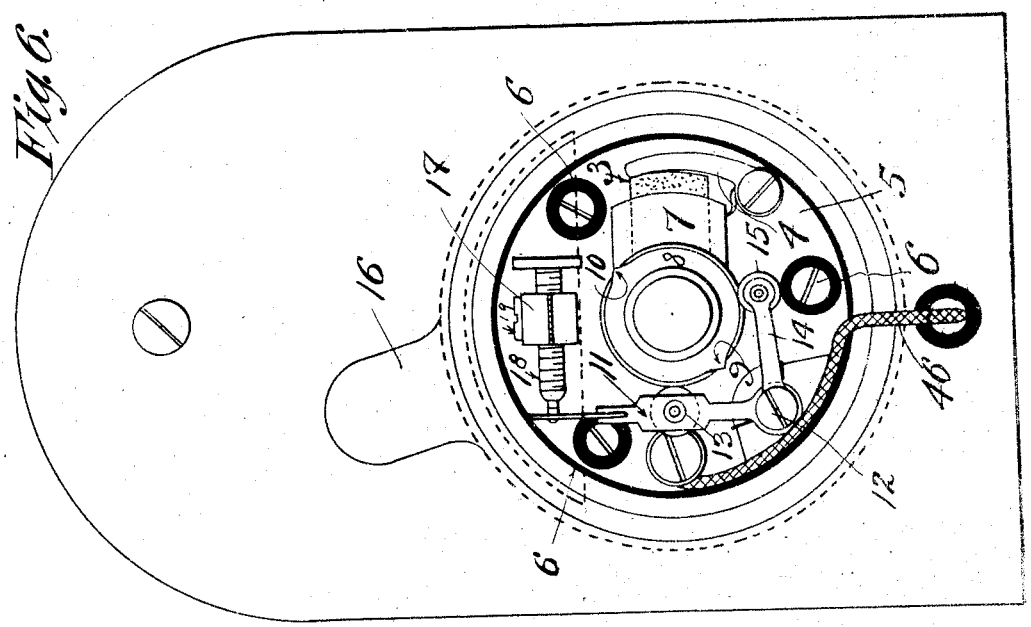

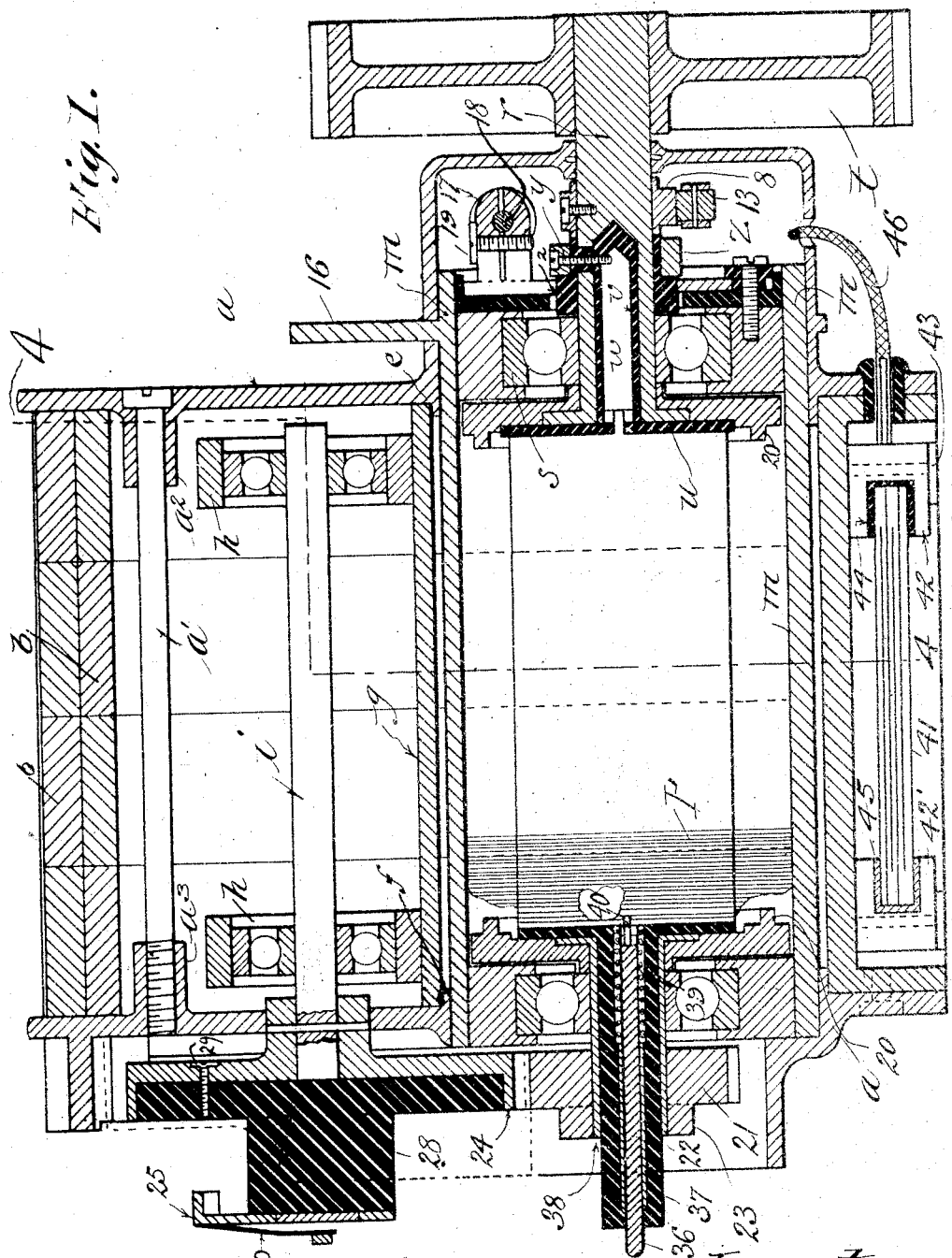

No. 885,255. PATENTED APR. 21, 1908.
E. B. JACOBSON.
MAGNETO ELECTRIC MACHINE.
APPLICATION FILED JULY 13, 1906.
5 SHEETS—SHEET 2.
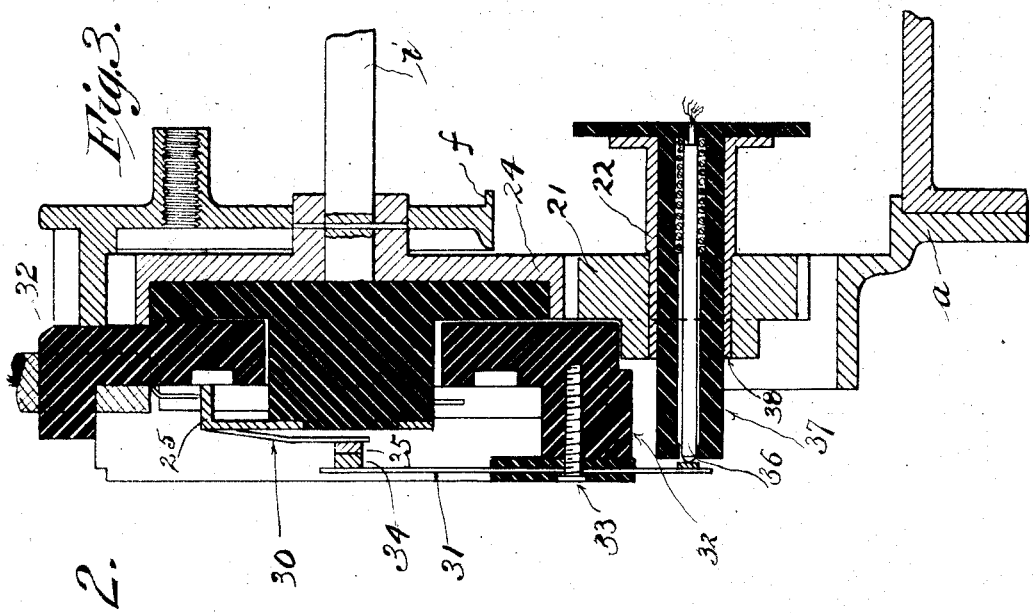
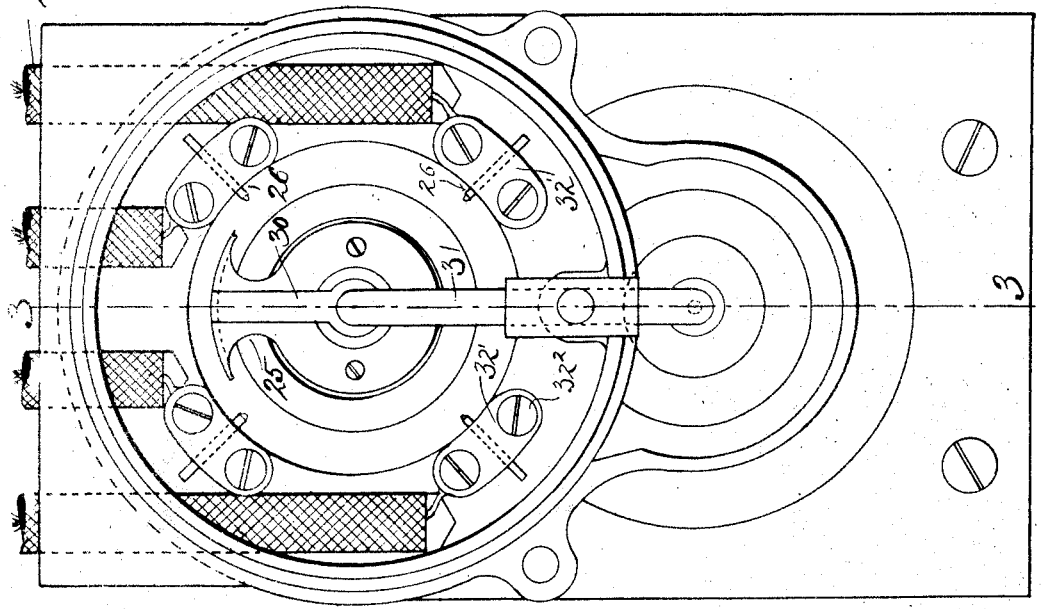
Witnesses:
H. L. Sprague
H. W. Bourn
Inventor.
Edward B Jacobson.
by Chapin & Co
Attorneys.

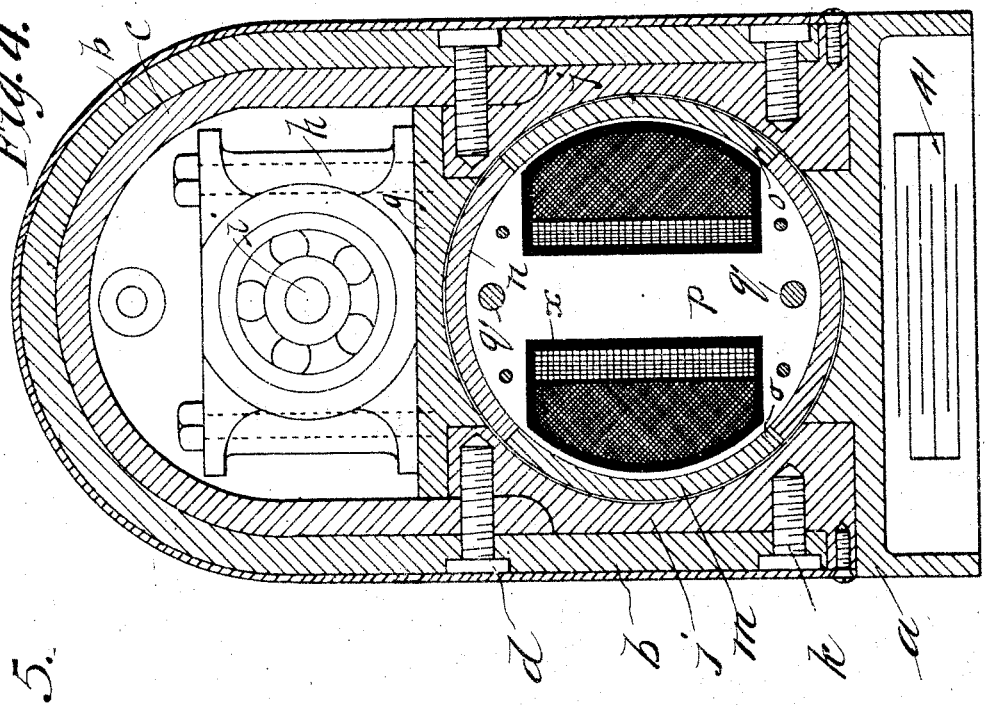
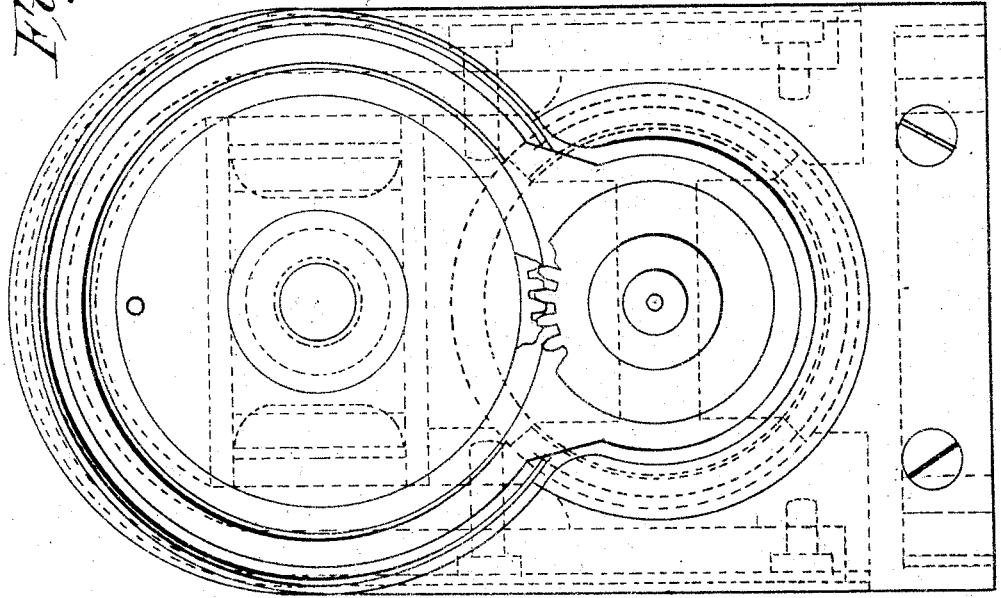

No. 885,255. PATENTED APR. 21, 1908.
E. B. JACOBSON.
MAGNETO ELECTRIC MACHINE.
APPLICATION FILED JULY 13, 1906.

5 SHEETS—SHEET 4.

Witnesses.
H. L. Sprague
H. W. Bowen

Inventor.
Edward B. Jacobson.
by Chafin & Co.
Attorneys.

No. 885,255. PATENTED APR. 21, 1908.
E. B. JACOBSON.
MAGNETO ELECTRIC MACHINE.
APPLICATION FILED JULY 13, 1906.
5 SHEETS—SHEET 5.
Fig. 8.
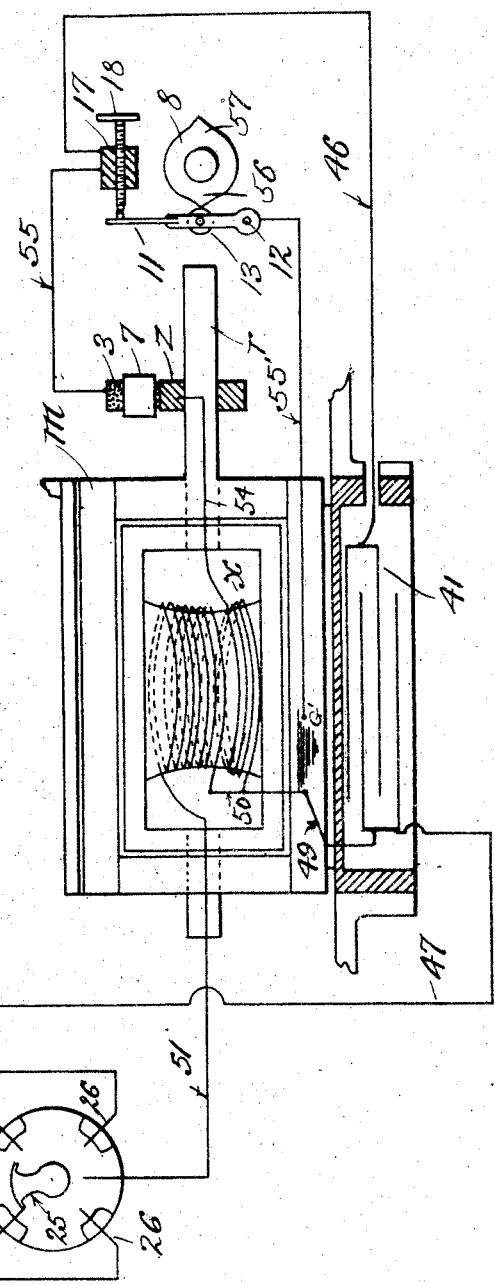
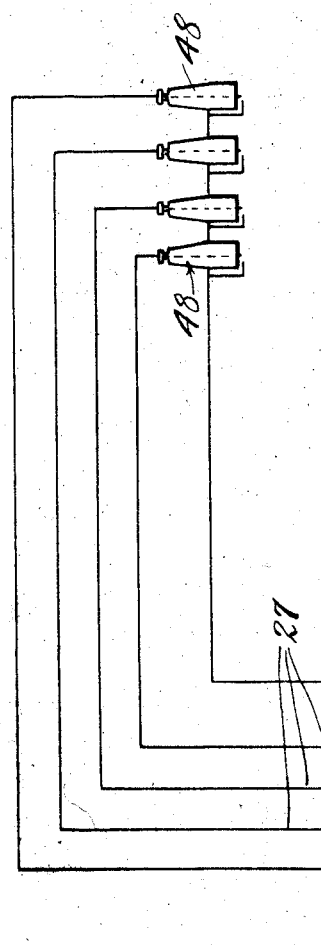
Witnesses:
H. L. Sprague
H. W. Bourn.
Inventor.
Edward B. Jacobson.
by Chapin & Co.
Attorneys.

UNITED STATES PATENT OFFICE.

EDWARD B. JACOBSON, OF PITTSFIELD, MASSACHUSETTS, ASSIGNOR TO PITTSFIELD SPARK COIL COMPANY, OF PITTSFIELD, MASSACHUSETTS, A CORPORATION.

MAGNETO-ELECTRIC MACHINE.

No. 885,255.    Specification of Letters Patent.    Patented April 21, 1908.

Application filed July 13, 1906. Serial No. 326,048.

*To all whom it may concern:*

Be it known that I, EDWARD B. JACOBSON, a citizen of the United States of America, residing at Pittsfield, in the county of Berkshire and State of Massachusetts, have invented new and useful Improvements in Magneto - Electric Machines, of which the following is a specification.

This invention relates to the class of electrical generators and more particularly to that class known as magneto electric machines of the high tension type in which a plurality of sets of permanent magnets of the horseshoe type are employed.

The machine is particularly designed for igniting the charge of vaporized combustible in engines of the internal combustion type.

The armature of the magneto employed is of the ordinary laminated type of soft iron having high permeability, the disks being of the shape employed in the ordinary Siemens H-armature, on which are wound two sets of windings similar to transformer windings, (that is, a primary and secondary), for the purpose of producing a high induction in the secondary winding, the windings being connected to a condenser suitably located on the machine; one terminal of the secondary winding being connected to a part I term the "distributer" driven by a secondary shaft geared to the shaft of the armature, the distributer being connected to the spark-plugs of different cylinders successively, as the same is rotated.

The machine is adapted to be located on some suitable part of the engine to which the armature can be easily connected for rotation and correctly timed with relation to the operative parts thereof. One of the important features of my invention is that the make and break connection between the primary winding of the armature and the condenser is such that the current which is delivered from the opposite terminal of the condenser through the primary winding is in opposite directions to the current which charges the condenser, whereby the armature is demagnetized and the electro-motive force in the secondary is greatly augmented.

Figure 7:
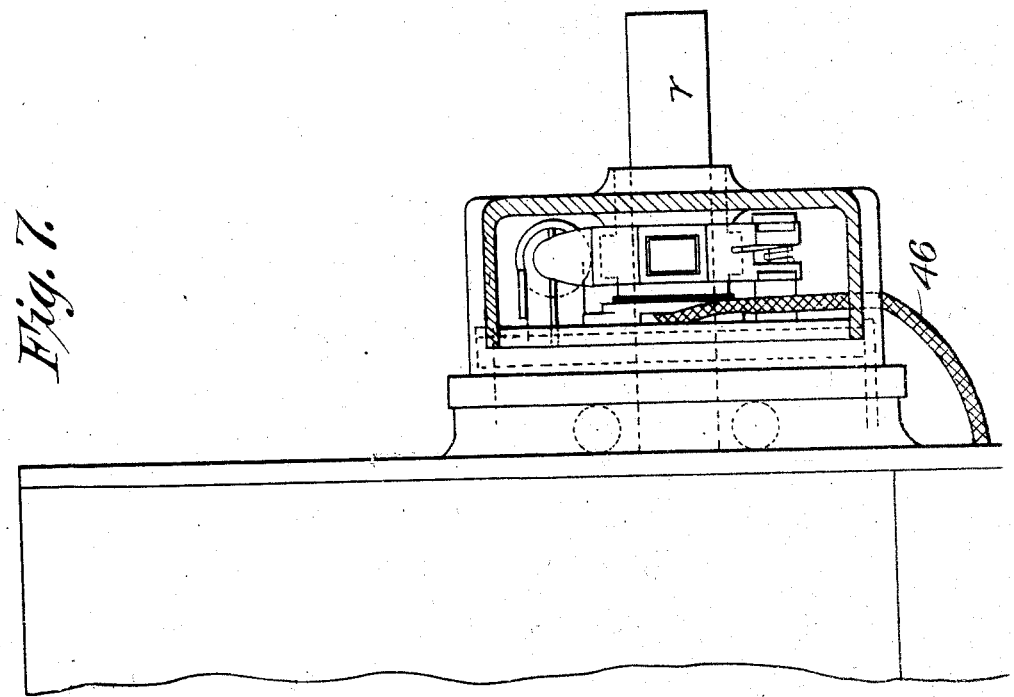

In the drawings forming part of this application,—Figure 1 is a longitudinal sectional view through the armature of the machine in a vertical plane thereof, with the inclosing case at the left omitted. Fig. 2 is an end elevation of the machine looking towards the distributer, and the several cables in operative relation to the same. Fig. 3 is a vertical section on line 3—3 of Fig. 2 showing in detail the arrangement of the armature, secondary shaft, and the distributer parts. Fig. 4 is a vertical sectional view on the line 4—4 of Fig. 1, showing the two sets of permanent magnets, the ball-bearing mounting for the secondary shaft, and the two sets of windings on the armature. Fig. 5 is an end elevation of the left-hand end of the machine showing the gear connection between the armature and secondary shafts, with certain parts omitted. Fig. 6 is a detail view of the make and break mechanism. Fig. 7 is a side elevation of Fig. 6,—partly in section. Fig. 8 is a diagrammatic view of the connections.

Referring to these drawings, in detail, *a* designates the frame portion of the machine, secured to which is a set of permanent magnets *b*, and secured to the magnets is another set of permanent magnets *c*, which are not as long as the magnets *b* but terminate at a point slightly below the top portion of the armature. The magnets *c* are secured to the magnets *b* by the machine bolts *d*, as shown.

The frame portion *a* is provided with two lugs or shoulders *e* and *f* for affording the support for a bridge-piece or platform *g* on which is mounted the pillar-block *h* for supporting the ball-bearing construction for the secondary shaft *i*.

*j* designates the pole pieces, (preferably of soft iron) that are secured to the longer permanent magnets *b* by the machine screws *k*.

*m* designates a cylindrical sleeve extending longitudinally of the machine and having a close fit within the pole-pieces *j*. This sleeve is made up of two different kinds of metal, as shown at *n* and *o*, the portion *n* being preferably of bronze or some non-magnetic metal, while the portion *o* is a magnetic metal, preferably iron, (see Fig. 4). The purpose of this particular construction of the cylindrical sleeve *m* is to direct and control the flow of the lines of force that pass from one pole-piece to the other, and the length of the arc of the pieces *o* is substantially equal to the length of the arc on the armature which incloses the windings of the two sets of coils, as shown.

*p* designates the core of the armature built up of laminations of soft iron secured together in the ordinary way, as by bolts or rivets $q$.

$r$ designates the right-hand end of the armature shaft which runs in the ordinary ball-bearing construction in the casing $a$, the ball-bearing boxes being designated by the letter $s$.

$t$ designates a gear secured to the end of the shaft $r$ for rotating the armature in unison with the engine in order to obtain the correct time at which the charge will be ignited.

$u$ designates a disk of insulation secured on the shaft $r$ and having integral therewith the sleeve $v$. Located within this sleeve $v$ is the pin $w$ of brass or other conducting material that is connected to one terminal of the primary winding $x$.

Electrically connected to the pin $w$ is the screw $y$ which is adapted to securely hold on the shaft $r$ the collector ring $z$.

2 designates a sleeve of insulating material on the shaft $r$ and interposed between the same and the ring $z$. Bearing on the ring $z$ is a carbon collector or brush 3 which is held in place against the ring $z$ by the spring-actuated arm 4 (see Fig. 6). This arm is pivotally mounted on a revoluble base-piece 5 which is secured to the bearing ring for the ball bearing boxes, as clearly shown in Fig. 1, by means of the screws 6.

7 indicates a casing for holding the carbon brush 3 in place. Also secured to the shaft $r$ is a cam 8 having two elevations 9 and 10.

Pivotally mounted on the ball-bearing fixture is a make and break lever 11, pivoted at the point 12 on the same, which carries a roller 13 adapted to engage the cam 8. Pivotally mounted at the point 12 is an arm 14 that is spring-connected to the lever 11, and carrying a roller 15 that also engages the cam 8. The spring connection is for the purpose of holding the lever 11 yieldingly against the cam 8.

16 is an arm integral with the sleeve $m$ for the purpose of rotating the sleeve for changing the path or flow of the lines of force through the armature, and also is for the purpose of changing the time of the make and break by the lever 11.

17 designates a post, internally screw threaded, for receiving the adjusting screw 18 that is engaged by the make and break lever 11. This post is provided with the ordinary clamping screw 19.

20 designates the end disks of the armature which are preferably constructed of bronze or some other non-magnetic material; and located between these disks are the laminations of the cover $p$ previously referred to.

21 is a gear secured to the end of the armature by means of the sleeve 22 and nut 23, the sleeve 22 being secured to the end of the disk 20 of the armature, as understood, and rotates in the ball-bearing support, as shown.

The gear 21 is adapted to mesh with the gear 24 on the secondary shaft $i$. The gear 24 is twice the diameter of the gear 21, the purpose of which is to reduce the number of revolutions of the curved distributer 25, shown clearly in Fig. 2, and adapted to pass in close proximity to the spark-pins 26,—four of which are shown in this figure. However, this number is immaterial as the number corresponds with the number of cylinders of the gas engine.

As the distributer 25 passes the spark-pins 26, a spark jumps from the part 25 to the part 26, and from thence passes through one of the cables 27 to the proper cylinder. The pins 26 are adjustably clamped to the piece 32 by means of the plates $32^1$ and screws $32^2$. It should be stated, however, that the distributer 25 is mounted on a block of hard rubber 28 which, in turn, is secured to the gear 24 by the rivets or screws 29.

30 is a spring-conducting arm carried by the piece 25.

31 designates a spring-conducting arm rigidly mounted on the hard rubber casing 32 by means of the screw 33.

The inner ends of the spring-arms 30 and 31 carry contact blocks 34 and 35.

36 is a spring-protruding contact-rod mounted in the insulating sleeve 37, and preferably made of hardened steel, and carried within the sleeve 22. Outside of this sleeve 22 is a metal tube 38.

39 designates a spring adapted to force the rod 36 outward.

40 designates a terminal leading from the secondary winding of the armature to the rod 36.

Located in the base of the machine is a condenser 41 made in the ordinary way of alternate layers of tinfoil and mica.

42 designates a metallic piece for securing the condenser to the casing of the machine by screws 43 or other suitable means.

44 is a channel or U-shaped piece of insulation, as fiberoid or rubber, for securing the ends of the condenser together, and mounted in the piece 42. 45 designates another channel or U-shaped piece for receiving the opposite end of the condenser, but instead of being made of insulating material it is made of conducting material, as for instance brass.

46 designates a cable leading from the right-hand end of the condenser 41 to the contact post 17, as shown in Fig. 1, or to the base-piece 5 (see Fig. 6.)

47 is shown as a wire (see Fig. 8) leading from the opposite terminal of the condenser 41 to one terminal of the framework of the engine-cylinders in which are placed the series of spark-plugs 48, but in fact is the engine frame. 49 is also shown as a wire connected to the same terminal of the condenser 41 as the wire 47, and grounded to the frame of the machine at $G^1$, and in fact is the base portion of the engine. 50 is shown as a wire connected to one terminal of the primary and secondary winding and also grounded on the frame of the machine, and is in fact the common ground or framework of the machine; the opposite terminal of the secondary being connected by a wire 51 which leads to the distributer 25, in close proximity to the collector-points 26, but not quite touching the same, these points being connected by cables 27 to the other terminal of the spark-plugs 48, as clearly shown.

54 designates a wire connected to the other terminal of the primary winding $x$ and leading to the collector ring $z$.

55 shows a wire (see Fig. 8) leading from the carbon brush 3 to the post 17 but in fact is the path of the current in the base-piece 5, and $55^1$ is shown as a wire leading from the make and break lever 11 to the framework of the machine at $G^1$, but in fact is the ground of the machine.

It will be noticed that the cam 8 on the armature shaft has two enlargements 56 and 57 which are placed diametrically opposite each other and so arranged with relation to the coils of the armature that they engage the anti-friction roller 13 at the same time that the coils are threaded by the greatest number of lines of force so that the induction in the armature at this time is greatest. The primary circuit is therefore broken at this point in the revolution of the armature thus producing in the secondary winding an induced electro motive force, and this induced electro-motive force occurs at the same instant that the distributer 25 is opposite one of the points 26, and a spark produced at the same time at one of the plugs 48.

It will be noticed that when the terminal 11 and the adjusting screw 18 are separated that the condenser is charged by means of the primary winding $x$.

It will also be noticed that the sets of permanent magnets $b$ and $c$ are secured together and to the casing $a$ by means of the bolt $a^1$ threaded at one end and passing through apertured lugs $a^2$ and $a^3$.

In operation, the current from the primary coil $x$ passing through the collector ring $z$, when the make and break lever 11 is closed, is short circuited through the frame of the machine. When the lever 11 opens the primary circuit, the condenser is discharged through the primary, and when the lever 11 closes the primary circuit, the condenser is charged in the opposite direction through the primary.

When the primary circuit is opened at a predetermined point in the revolution of the armature, a powerful current is induced in the secondary winding just at the instant when the largest number of lines of force are threading through the armature. At this instant, the distributer 25 is opposite one of the collector-pins 26, thus closing the circuit through the secondary winding and the proper spark-plug, it being understood that the timing of the rotation of the distributer and armature is such, by reason of the relative sizes of the gears and cam 8, that the induced current in the secondary, and through the spark-plugs, is in opposite directions, since the current is an alternating one.

An important feature of my invention is that by reason of the sleeve $m$, as constructed, and the powerful compound magnet, it is possible to remove the armature and shell without destroying the efficiency of the machine, as the sparking distance remains the same after being dismantled and reassembled, as before dismantling the machine.

I have also found that the spark is strong enough to explode the charge of combustible in the engine cylinders when the engine is cranked for starting the same.

What I claim is:—

1. In a magneto-electrical machine, the combination with a plurality of sets of permanent magnets, having pole pieces an armature having primary and secondary windings thereon, a shell having a cylindrical unbroken outer surface from end to end thereof and composed of magnetic and non-magnetic material, the magnetic material being set into the non-magnetic material and arranged opposite, and in close proximity to, the pole pieces, the major portion of the shell being of non-magnetic material whereby upon rotation of the shell the flow of the lines of force through the armature may be controlled, as described.

2. In an electric ignition system, a permanent magnet, pole-pieces secured thereto, a second permanent magnet the limbs of which are shorter than the other permanent magnets and secured thereto, a shell, the outer cylindrical surface of which is unbroken, for screening a portion of the lines of force passing from one pole-piece to the other, and an armature having primary and secondary windings thereon, the shell being composed of magnetic and non-magnetic material, the non-magnetic material constituting practically one-half the circumference of the shell.

3. In an electric ignition system, a permanent magnet, pole-pieces secured thereto, a second permanent magnet the limbs of which are shorter than the other permanent magnets and secured thereto, a rotatable shell for screening a portion of the lines of force passing from one pole-piece to the other, and an armature having primary and secondary windings thereon, the shell being composed of magnetic and non-magnetic material, the non-magnetic material constituting practically one-half the circumference of the shell, the outer curved surface of the shell being continuous throughout, as described.

4. In an ignition system, sets of permanent magnets, an armature having primary and secondary windings thereon, a rotatable screen for the armature and having an unbroken periphery, the armature being provided with a make and break device for the primary windings, a distributer, a wire connected thereto and with one terminal of the secondary winding on the armature, a collector-point adjacent the distributer, a spark-plug, a wire connecting the two, and a wire leading from the other terminal of the spark-plug to the other terminal of the secondary of the armature windings, as described.

5. In a magneto electrical machine, in combination, an armature having primary and secondary windings, a secondary shaft, gearing connecting the two, a distributer carried by the gear on the secondary, said gear being twice the diameter of the gear on the armature, a spring-arm carried by the distributer, a second spring arm mounted in the casing and engaging the first arm the second spring-arm being connected to the secondary, a make and break device on the armature, a series of spark-plugs, connections between the spark-plugs and the distributer, connections between the make and break device and the primary, and connections between the secondary and the spark-plugs, a condenser connected across the terminals of the make and break device, whereby when the armature is so disposed as to include the greatest possible number of lines of force, the make and break device will be opened and current in the same direction induced in the secondary through the distributer and spark-plugs as described.

6. A magneto electrical machine having in combination, a series of permanent magnets, an armature, a rotatable cylindrical screen or shell therefor, the screen or shell being composed of magnetic and non-magnetic material, the magnetic and non-magnetic material constituting substantially equal amounts in the screen or shell, and the periphery of the same having an unbroken surface.

EDWARD B. JACOBSON.

Witnesses:
JONATHAN HAIGHT,
EDWARD T. SCULLY.